US007438449B2

(12) United States Patent
Lai et al.

(10) Patent No.: US 7,438,449 B2
(45) Date of Patent: Oct. 21, 2008

(54) LIGHT EMITTING DIODE MODULE HAVING A LATCHING COMPONENT AND A HEAT-DISSIPATING DEVICE

(75) Inventors: Cheng-Tien Lai, Taipei Hsien (TW); Zhi-Yong Zhou, Shenzhen (CN); Qiao-Li Ding, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/621,759

(22) Filed: Jan. 10, 2007

(65) Prior Publication Data

US 2008/0165536 A1 Jul. 10, 2008

(51) Int. Cl.
*B60Q 1/06* (2006.01)

(52) U.S. Cl. ......................... 362/373; 439/56; 361/801; 165/104.26; 165/104.33; 362/800

(58) Field of Classification Search ................. 362/218, 362/294, 373, 800, 547, 264, 345, 646, 652, 362/580; 257/675; 361/687, 698–702, 801, 361/802, 759; 165/80.4, 80.5, 104.21, 104.26; 313/500, 512, 11; 174/252, 260; 439/56
See application file for complete search history.

(56) References Cited

U.S. PATENT DOCUMENTS

| | | | | |
|---|---|---|---|---|
| 6,517,221 | B1 * | 2/2003 | Xie | 362/373 |
| 6,787,999 | B2 * | 9/2004 | Stimac et al. | 315/51 |
| 2004/0213016 | A1 * | 10/2004 | Rice | 362/547 |
| 2005/0024875 | A1 * | 2/2005 | Zhang | 362/264 |
| 2007/0041220 | A1 * | 2/2007 | Lynch | 362/646 |
| 2007/0090737 | A1 * | 4/2007 | Hu et al. | 313/11 |
| 2007/0201232 | A1 * | 8/2007 | Chen | 362/294 |

* cited by examiner

*Primary Examiner*—Jong-Suk (James) Lee
*Assistant Examiner*—Kevin Spinella
(74) *Attorney, Agent, or Firm*—Frank R. Niranjan

(57) ABSTRACT

An LED module includes a latching component, a frame holding an LED thereon, a heat spreader located in the latching component and a heat transfer member having a heat-dissipating unit remote from the LED and a heat pipe thermally connecting with the heat spreader, the LED and the heat-dissipating unit. The latching component cooperates with the heat spreader to tightly press the frame being attached on the heat spreader. The heat transfer member thermally connects with the heat spreader and transfers heat from the LED to an ambient environment. The latching component has two spring pieces pushing the frame toward the heat spreader and the heat pipe. The spring pieces electrically engage with the frame to thereby electrically connect with the LED.

14 Claims, 4 Drawing Sheets

LIGHT EMITTING DIODE MODULE HAVING A LATCHING COMPONENT AND A HEAT-DISSIPATING DEVICE

BACKGROUND OF THE INVENTION

1. Field of the Invention

The present invention relates to a light emitting diode module, more particularly to a light emitting diode module having a latching component for conveniently installing the light emitting diode thereon or unloading the light emitting diode therefrom.

2. Description of Related Art

A light emitting diode (LED) is a device for transforming electricity into light. When a current flows through a junction comprising two different semiconductors, electrons and holes combine to generate light. LEDs are small, inexpensive, with low power requirements and an extremely long working lifetime under specific conditions; more and more LED modules with different capabilities are being developed. However, the LEDs are sensitive to temperature and may be permanently damaged by excessive temperatures. High temperature performance of LEDs is an adverse aspect of LED technology that has not been satisfactorily resolved. As the LEDs are used for a long time and more power is added to the LEDs, heat generated by the LEDs must be quickly removed therefrom to prevent them from becoming unstable or being damaged. Accordingly, LED modules with heat dissipation devices are needed.

Generally, the LED modules have thermal management components with good heat dissipation qualities. Usually, the LED usually has a smaller volume and it is different to secure the LED to the thermal management component.

What is needed, therefore, is an LED module having a latching component for conveniently installing the LED thereto or unloading the LED therefrom.

SUMMARY OF THE INVENTION

An LED module includes a latching component, a frame holding an LED thereon, a heat spreader located in the latching component and a heat transfer member having a heat-dissipating unit remote from the LED and a heat pipe thermally connecting the heat spreader, the LED and the heat-dissipating unit together. The latching component cooperates with the heat spreader to tightly press the frame to be attached on the heat spreader. The heat transfer member thermally connects with the heat spreader and transfers heat from the LED to an ambient environment. The latching component has two spring pieces fixed therein. The two spring pieces are electrically connected with a power source. Furthermore, the two spring pieces push the frame toward the heat pipe and the heat spreader and electrically connect with the frame and the LED.

Other advantages and novel features will become more apparent from the following detailed description of preferred embodiments when taken in conjunction with the accompanying drawings, in which:

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE INVENTION

Figure 1:
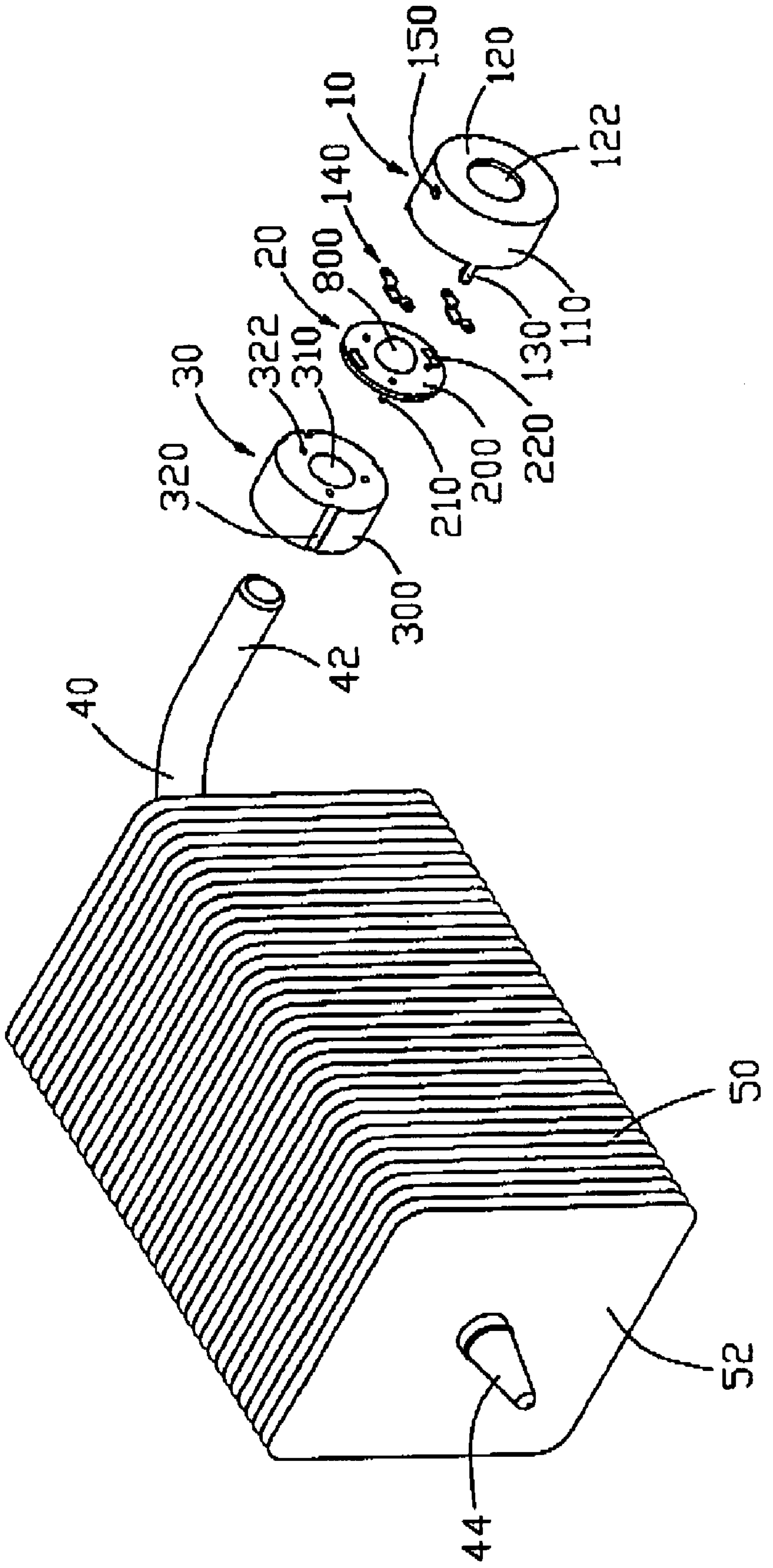
FIG. 1 is an exploded, schematic view of an LED module in accordance with a preferred embodiment of the present invention.
Figure 2:
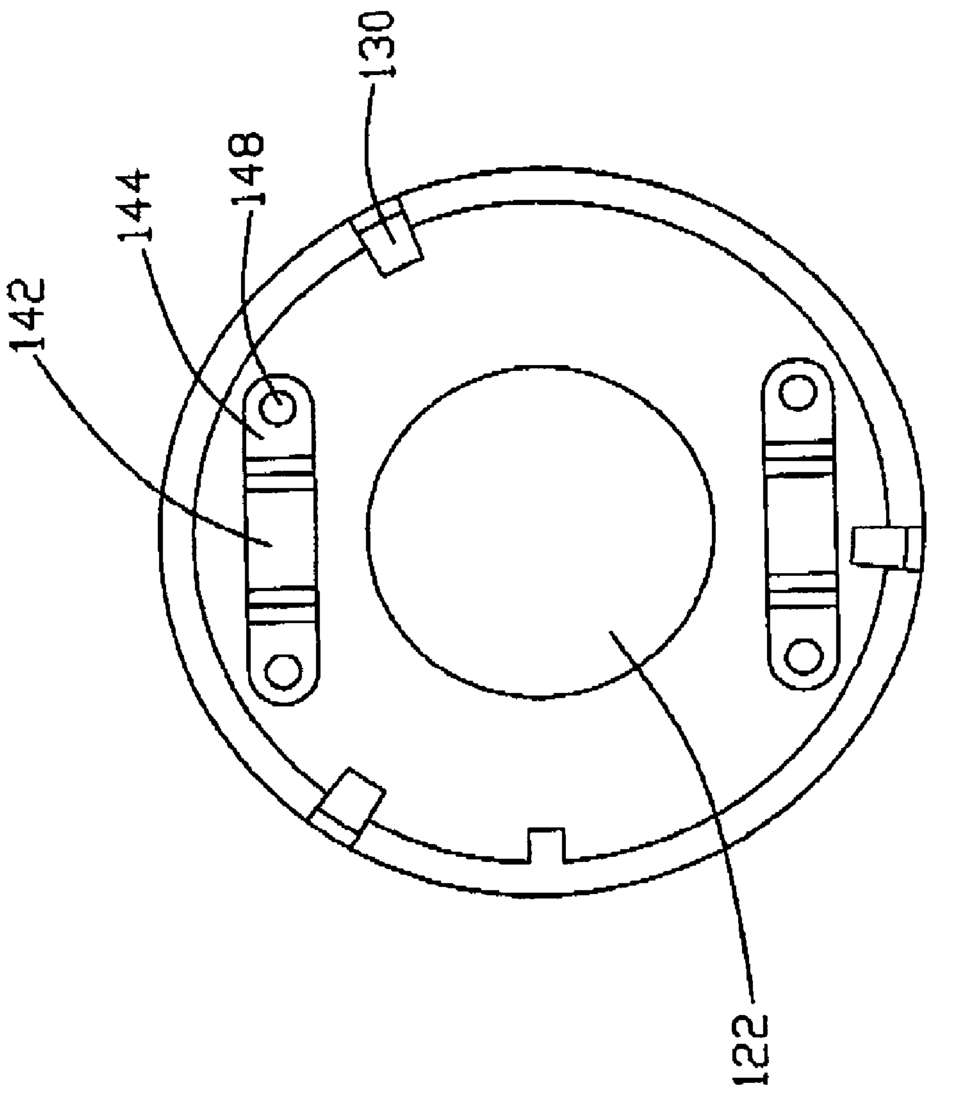
FIG. 2 is an enlarged rear end view of a latching component of the LED module of FIG. 1.
Figure 3:
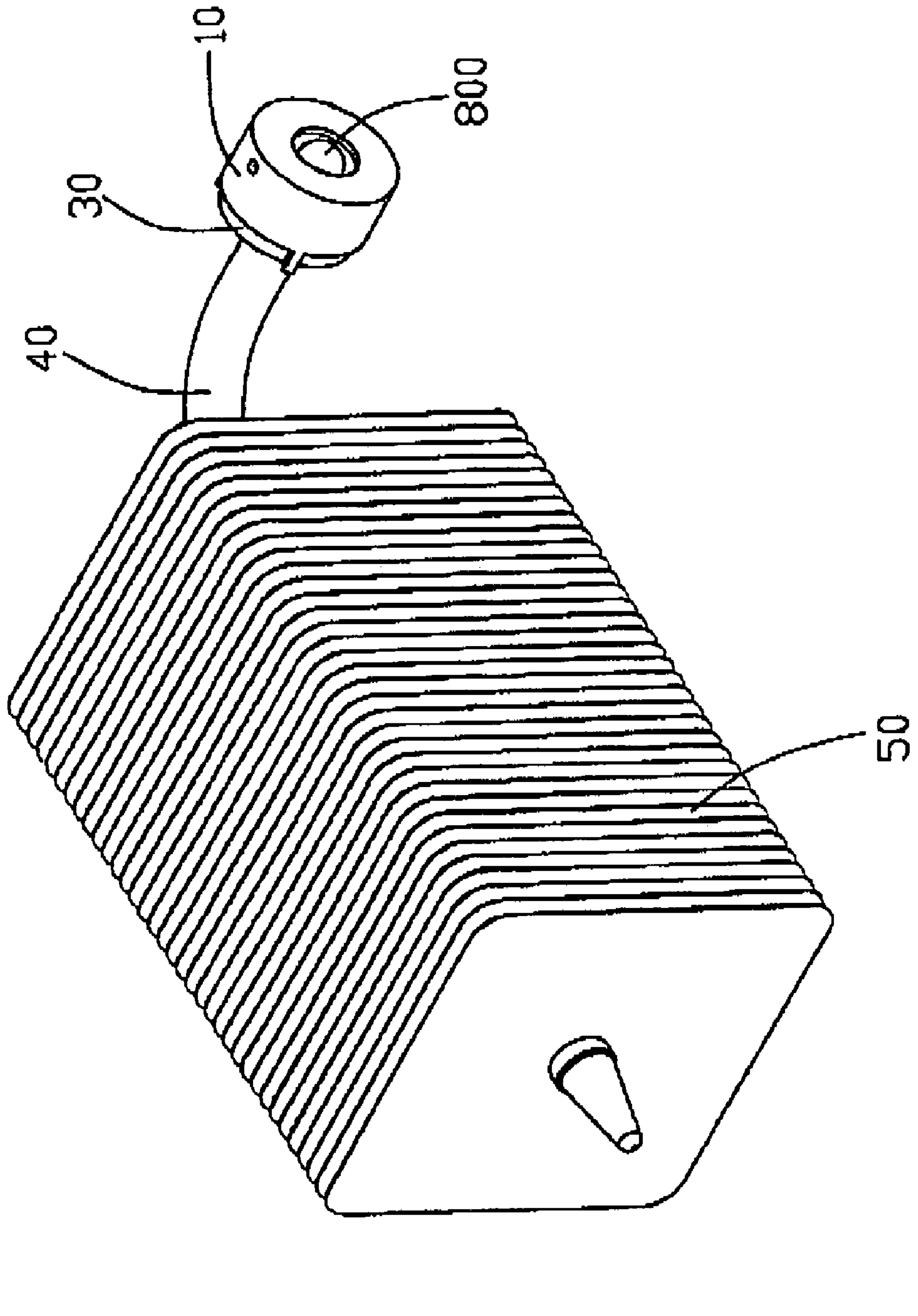
FIG. 3 is an assembled view of FIG. 1.
Figure 4:
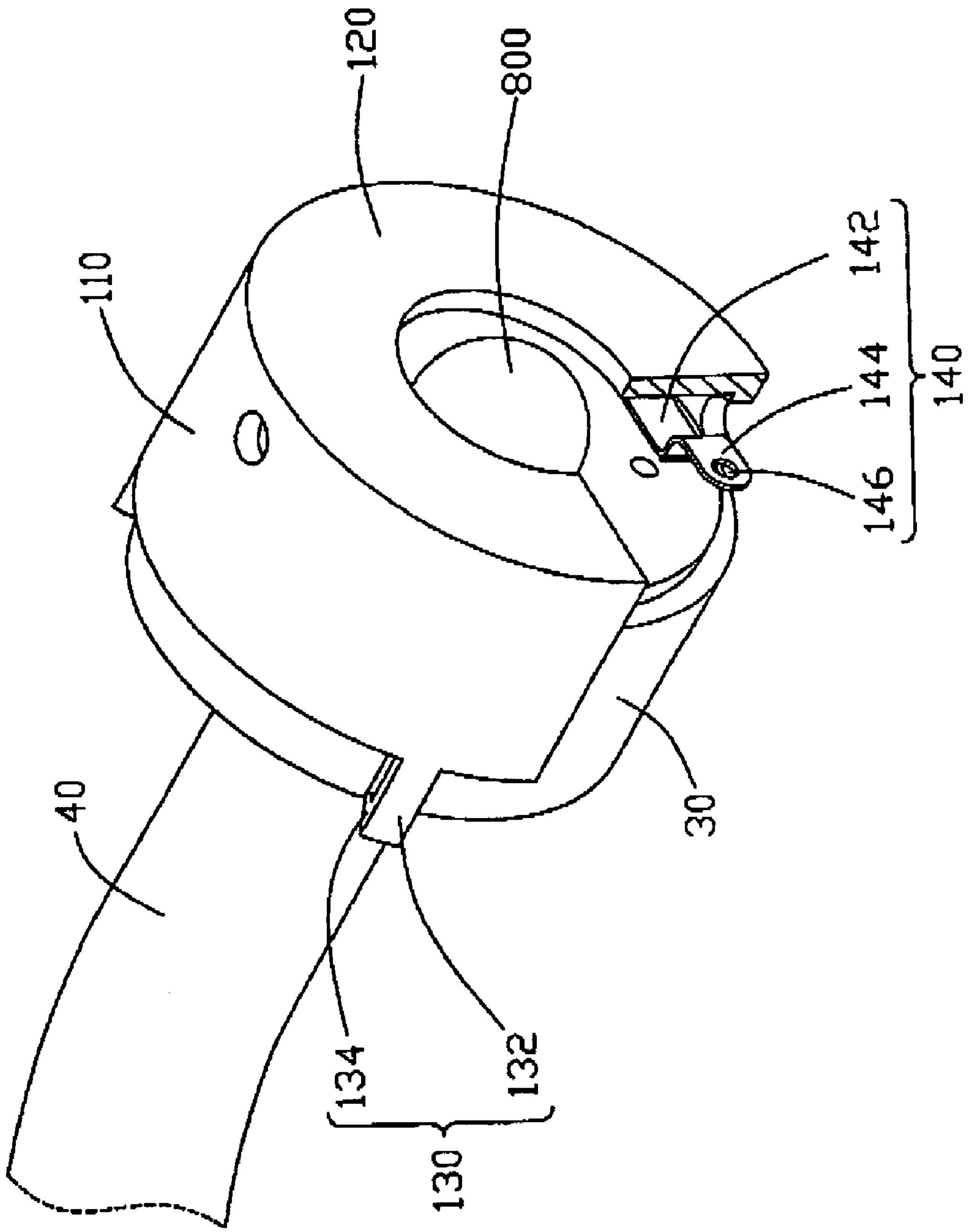
FIG. 4 is an enlarged, partial view of FIG. 3 with a part thereof being cut away.

Referring to FIGS. 1-4, an LED module in accordance with a preferred embodiment of the present invention comprises a latching component 10, a frame 20 mounting an LED 800 thereon and located in the latching component 10, a heat spreader 30 attached to the frame 20 and a heat-transfer member having a heat pipe 40 and a heat-dissipating unit 50. The heat pipe 40 thermally connects the frame 20 with the heat-dissipating unit 50.

The latching component 10 is made of elastic plastic and has a cylindrical configuration. The latching component 10 comprises a cylindrical body 110. The body 110 has a top surface 120 on a front end portion thereof and a rear end portion (not labeled) opposite the front end portion. A round opening 122 is defined in a center of the top surface 120 for offering the LED 800 an exit so that the LED 800 is exposed over the top surface 120 of the body 110. Three elastic legs 130 are extended from an edge of the rear end portion of the body 110 and are evenly spaced from each other along a circumference of the body 110. Each leg 130 comprises a position portion 132 extending from an edge of the rear end portion of the body 110 and a hooked portion 134 extending inwardly from the position portion 132 and having an acute angle to the position portion 132. A pair of spring pieces 140 are formed on an inner surface of the top surface 120 of the body 110. Each spring piece 140 comprises a strip-shaped body 142 and a pair of fixed claws 144 extending from two opposite end portions of the strip-shaped body 142. The fixed claws 144 are upwardly and outwardly curved to be parallel to the body 142 and each defines a hole 146 therein. A pair of projections 148 are formed on the inner surface of the top surface 120 of the body 110 and engaged in the holes 146 of the fixed claws 144 of each spring piece 140 to position the spring piece 140 on the inner surface of the body 110 of the latching component 10.

The frame 20 has a round plate 200, such as a printed circuit board and the LED 800 is electrically connected to the frame 20 to emit light. The frame 20 comprises a top surface on which the LED 800 is mounted and a bottom surface on an opposite side to the top surface. Three pins 210 (only one shown) are formed on the bottom surface of the frame 20.

Since the LED 800 inherently has a too small surface available to sufficiently transfer heat therefrom, the heat transfer member is used to transfer the heat to a place where it can be dissipated. The heat pipe 40 and the heat-dissipating unit 50 can satisfy this demand. Firstly, the heat spreader 30 is used to spread the heat from the LED 800. The heat spreader 30 can be made of aluminum or copper. The heat spreader 30 has a cylindrical body 300 with a hollow cylindrical portion in a center thereof. A circular passage 310 is defined through the center of the heat spreader 30. Three slots 320 are defined in an outer surface and along an axial direction of the body 300 of the heat spreader 30, corresponding to the legs 130 of the latching component 10. The three slots 320 divide the circumference of the body 300 of the heat spreader 30 into three equal parts. Three positioning holes 322 are defined in a front-end portion of the body 300 of the heat spreader 30 and corresponding to the pins 210 of the frame 20.

The heat pipe 40 has an evaporating section 42 engaged in the passage 310 of the heat spreader 30, and a condensing section 44 perpendicular to the evaporating section 42 and inserted through the heat-dissipating unit 50. The heat-dissipating unit 50 comprises a plurality of metallic fins 52. The fins 52 are parallel to and separate from each other. A through hole (not shown) is defined in a center of the heat-dissipating unit 50, transversely extending though all of the fins 52. The evaporating section 42 and the condensing section 44 of the heat pipe 40 are fixed in the passage 310 of the heat spreader 30 and the through hole of the heat-dissipating unit 50 respectively by soldering; accordingly, the condensing section 44 of the heat pipe 40 is thermally engaged with the metallic fins 52, and the evaporating section 42 of the heat pipe 40 is thermally engaged with the heat spreader 30. The heat pipe 40 is preferably included to quickly transfer the heat from the LED 800 to the heat-dissipating unit 50 which can be arranged at a location remote from the LED 800 and can have a large heat-dissipating surface available to facilitate heat dissipation.

In assembly, the evaporating section 42 of the heat pipe 40 extends in the passage 310 of the heat spreader 30 by soldering and a front end of the evaporating section 42 projects out from the passage 310 so as to absorb the heat from the LED 800 quickly. The pins 210 of the frame 20 are inserted and positioned in the positioning holes 322 of the front end portion of the body 300 of the heat spreader 30. The bottom surface of the frame 20 is attached on the top surface of the evaporating section 42 of the heat pipe 40. The latching component 10 covers the heat spreader 30 and the legs 130 of the latching component 10 slide along the slots 320 of the heat spreader 30 until the hooked portions 134 of the legs 130 exert spring forces to clasp and engage a rear end portion of the heat spreader 30. Accordingly, the latching component 10 is secured to the spreader 30 by the hooked portions 134 engaging the rear end portion of the heat spreader 30. As the legs 130 of the latching component 10 engage the heat spreader 30 to exert the latching forces thereon, the bodies 142 of the spring pieces 140 of the latching component 10 also exert spring forces to press the frame 20 to be tightly attached to the heat spreader 30, and the frame 20 is thus tightly sandwiched between the latching component 10 and the heat spreader 30. The bodies 142 resiliently engage with positive and negative electrodes 220 on the round plate 200, whereby the spring pieces 140 are electrically connected with the round plate 200 and the LED 800. Wires (not show) which are connected to a power source can be extended through two holes 150 (only one shown) defined in a periphery of the latching component 10 to electrically connect with the spring pieces 140. Thus, the round plate 200 and the LED 800 are electrically connected with the power source via the spring pieces 140.

In operation, the evaporating section 42 of the heat pipe 40 absorbs the heat from the LED 800. A minor part of the heat is conducted to the heat spreader 30 by the evaporating section 42 of the heat pipe 40 and a major part of the heat is directly transferred to the fins 52 of the heat-dissipating unit 50; the heat from the LED 800 is thus quickly removed to avoid a high temperature performance of the LED 800 and ensure that the LED 800 operates at a normal working temperature. Furthermore, the heat pipe 40 transfers the heat generated by the LED 800 to the heat-dissipating unit 50 which is located at a location remote from the LED 800 and thus has a large heat-dissipating surface available to facilitate heat dissipation.

In the preferred embodiment of the present invention, the frame 20 is sandwiched between the latching component 10 and the heat spreader 30. The frame 20 is secured on the heat spreader 30 by the legs 130 of the latching component 10 clasping on the heat spreader 30 and it is convenient for installing/unloading the LED 800 to/from the heat spreader 30. Moreover, the heat spreader 30 is located in the latching component 10 to be coupled as a unit, which is very advantageous in view of the compact size and portable requirement of heat dissipation devices with the LEDs.

It is believed that the present embodiments and their advantages will be understood from the foregoing description, and it will be apparent that various changes may be made thereto without departing from the spirit and scope of the invention or sacrificing all of its material advantages, the examples here described merely being preferred or exemplary embodiments of the invention.

What is claimed is:

1. A LED module comprising:

a latching component having a cylindrical configuration;

a frame disposed in the latching component;

a LED electrically mounted on the frame;

a heat spreader located in the latching component and spreading heat from the LED; and a heat-transfer member having a heat-dissipating unit remote from the frame and a heat pipe thermally connecting with the frame, the heat spreader and the heat-dissipating unit;

wherein the latching component engages with the heat spreader and presses the frame into tight attachment on the heat spreader, whereby the frame is sandwiched between the latching component and the heat spreader by the latching component pressing against the frame toward the heat spreader, and wherein the heat spreader is received in the latching component, and the heat pipe is inserted into the heat spreader along an axial direction of the latching component and has a front end projecting out of the heat spreader and a front end face attached to the frame;

wherein the latching component comprises a plurality of spring pieces pressing on the frame toward the spreader and the spring pieces press the frame to be attached on the heat spreader, the spring pieces electrically connecting with the LED; and wherein each of the spring pieces has a strip-shaped body which is spaced from the latching component and abuts against the frame and two fixed claws at two opposite ends of the strip-shaped body, the two fixed claws being coupled to the latching component.

2. The LED module as claimed in claim 1, wherein the latching component comprises a plurality of elastic legs extending from an end edge thereof and the legs exert latching forces on the heat spreader to make the latching component tightly press the frame onto the heat spreader.

3. The LED module as claimed in claim 2, wherein each leg comprises a hooked portion extending from a free end thereof and the hooked portion engages with a bottom of the heat spreader.

4. The LED module as claimed in claim 1, wherein the frame comprises a plurality of pins and the pins are inserted into the heat spreader.

5. The LED module as claimed in claim 1, wherein the heat pipe has an evaporating section extending in the heat spreader and a condensing section inserted through the heat-dissipating unit.

6. The LED module as claimed in claim 5, wherein the heat spreader has a cylindrical configuration and defines a passage therein for accommodating the evaporating section of the heat pipe.

7. A LED module having a LED connected to a power source, the LED module comprising:

a heat-transfer member having a heat-dissipating unit remote from the LED and a heat-transferring unit thermally connecting the LED and the heat-dissipating unit for dissipating heat from the LED through the heat-dissipating unit;

a heat spreader coupled to the heat-transferring unit of the heat-transfer member and spreading the heat from the LED;

a circuit board positioned on the heat spreader, wherein the circuit board holds the LED thereon and is electrically connected to the LED; and a latching component covering and secured to the heat spreader, the latching component comprising a top surface at an end thereof and a plurality of hooked portions at another end thereof exerting a spring force on the heat spreader;

wherein the heat spreader is located in the latching component and engages with the latching component to tightly attached to the heat spreader by when the hooked portions engaging with the heat spreader;

wherein the latching component comprises a plurality of spring pieces and the spring pieces press the circuit board being attached to the heat spreader, the spring pieces electrically connecting with the circuit board and the LED; and wherein each spring piece comprises a strip-shaped body and a pair of fixed claws extending from two opposite end portions of the strip-shaped body.

8. The LED module as claimed in claim 7, wherein the latching component has a cylindrical configuration.

9. The LED module as claimed in claim 7, wherein the fixed claws are upwardly and outwardly curved to be parallel to the body and each defines a hole therein, and wherein a pair of projections are formed on an inner surface of the latching component and engage in the holes of the fixed claws.

10. A LED module comprising:

a printed circuit board having a LED mounted on a first surface thereof;

a heat spreader abutting against a second surface of the printed circuit board opposite the first surface thereof;

a heat pipe having an evaporating section extending through the heat spreader to thermally connect with the second surface of the printed circuit board and the LED, the evaporating section of the heat pipe being perpendicular to and engaging with the second surface of the printed circuit board; and a latching member enclosing the printed circuit board and the heat spreader therein, engaging with the heat spreader and having a spring member exerting a pushing force on the printed circuit board toward the heat spreader and the evaporating section of the heat pipe, the spring member electrically connecting with the printed circuit board and the LED;

wherein the spring member comprises a strip-shaped body pressing on the printed circuit board and two fixed claws extending from two opposite ends of the strip-shaped body.

11. The LED module as claimed in claim 10, wherein the heat pipe has a condensing section remote from the evaporating section and thermally connecting with a plurality of metal fins.

12. The LED module as claimed in claim 11, wherein the printed circuit board has an electrode thereon, and the spring member resiliently engages with the electrode.

13. The LED module as claimed in claim 10, wherein the latching member is a cylinder receiving the heat spreader therein, and the evaporating section of the heat pipe is oriented perpendicular to the printed circuit board and extends through the heat spreader along an axial direction of the latching member.

14. The LED module as claimed in claim 10, wherein the fixed claws are upwardly and outwardly extended from the body to be parallel to the body and each define a hole therein, and a pair of projections are formed on an inner surface of the latching member and engage into the holes of the fixed claws.

* * * * *